United States Patent [19]
Felker et al.

[11] Patent Number: 4,799,211
[45] Date of Patent: Jan. 17, 1989

[54] APPARATUS AND METHOD FOR STORING PERFORMANCE PARAMETERS OF LOCAL AREA NETWORK SYSTEM MEMBERS

[75] Inventors: Michael Felker, Rio Rancho; Angelo Viverito, Albuquerque, both of N. Mex.

[73] Assignee: Digital Equipment Corporation, Maynard, Mass.

[21] Appl. No.: 76,724

[22] Filed: Jul. 23, 1987

[51] Int. Cl.⁴ ............................................. H01J 1/16
[52] U.S. Cl. ............................................. 370/17
[58] Field of Search .................. 370/17, 13, 85, 86, 370/DIG. 1; 340/825.5; 379/6, 10, 12, 16

[56] References Cited

U.S. PATENT DOCUMENTS 4,597,072  6/1986  Somlai et al. ....................... 370/17
4,611,320  9/1986  Southard ............................ 370/17
4,692,761  9/1987  Robinton ............................ 370/17

Primary Examiner—Robert L. Griffin
Assistant Examiner—Frank M. Scutch, III
Attorney, Agent, or Firm—William W. Holloway; T. Carter Pledger

[57] ABSTRACT

A remote segment monitor unit is disclosed that is coupled to a segment cable of a local area network system. The remote segment monitor unit, for each transaction on the cable segment, determines a value related to the transaction signal strength and determines the identity of the network node from which the transaction originated. By providing a record of the transaction signal strength associated with each network node as a function of time, components that are functioning outside of acceptable boundaries, components showing erratic behavior and components with deteriorating performance can be identified.

20 Claims, 4 Drawing Sheets

APPARATUS AND METHOD FOR STORING PERFORMANCE PARAMETERS OF LOCAL AREA NETWORK SYSTEM MEMBERS

BACKGROUND OF THE INVENTION

1. Field of the Invention

This invention relates generally to local area networks (LANs) and more particularly to apparatus and a method for analyzing the performance of the system members coupled to the local area network.

2. Description of the Related Art

For certain local area networks, such as the Carrier Sense Multiple Access/Collision Detect (CSMA/CD) architecture, as defined by the IEEE 802.3, multiplicity of devices can be coupled to a segment (cable) of the local area network. For example, the devices can be coupled to a segment consisting of a coaxial cable segment 500 meters in length. A local area network can include a plurality of segment cables, each segment cable coupled by a repeater unit (to compensate for losses experienced by propagation along the cable) to other segment cables and having up to 1024 system members coupled thereto. The system members are coupled to the coaxial cable by means of a device typically referred to as a tap. The tap is a unit that clamps onto the coaxial cable, pushes aside the braided grounding wire, and forces a small pin into the central conducting element to detect signals transmitted on the conducting element. Referring now to FIG. 1, the typical configuration of a device coupled to the segment cable is shown. The tap and transceiver unit 12 is coupled to the coaxial segment cable 11. The tap portion physically couples to segment cable, while the transceiver portion encodes signals that are applied to the segment cable 11 in the specified local area network format and decodes signals received from the segment cable 11. The network interconnect unit 14 is coupled to the tap and transceiver unit 12 and provides the data link protocols specific to the local area network. The network interconnect unit 14 typically provides power for the trap and transceiver unit 12 through the same conducting leads that carry the signals. The network interconnect unit 14 is typically contained within a data processing system 15, the data processing system typically referred to as a network node.

Data is transferred between local area network system members over at least one segment cable. The data is typically transferred in groups of signals referred to as packets. The packets, in addition to the information conveyed therein, include a plurality of identifying fields such as the source local area network system member and the target local area network member. The presence of the field specifying the source of the data packet in the packet itself is important to the operation of the invention disclosed herein.

A need has therefore been felt for apparatus and for a method that can determine characteristics of system members coupled to a local area network segment cable. Specifically, apparatus and a method are needed that can identify devices that are providing signals having characteristics outside permitted limits and can identify failing system members.

FEATURES OF THE INVENTION

It is an object of the present invention to provide an improved local area network.

It is a feature of the present invention to provide a technique for identifying and storing parameters associated with system members coupled to a local area network segment cable.

It is another feature of the present invention to provide a technique for identifying a failing system member coupled to a local area network segment cable.

It is yet another feature of the present invention to provide a device coupled to the segment cable of a local area network that can associate transaction signal parameters with the source of the transaction.

It is a still further feature of the present invention to provide a device coupled to the local area network that can store parameters associated with a transaction along with an identification of the network node originating the transaction.

SUMMARY OF THE INVENTION

The aforementioned and other features are accomplished, according to the present invention, by a remote segment monitor unit that samples and stores signal parameters, i.e., related to the voltage level of the transaction, associated with each transaction on the segment cable of a local area network. For each transaction, the remote segment monitor unit decodes the preamble (or header) information to identify the network system member from which the transaction originated. When the transaction origin is identified and the transaction is valid, then the signal parameters are stored together with the identification of the associated system member originating the transaction. The information is stored in such a manner that the time dependence of the signal parameters associated with each system member can be determined and characteristics of the transaction source or intervening apparatus (e.g., such as a repeater amplifier) can be inferred.

These and other features of the present invention will be understood upon reading of the following description along with the drawings.

DESCRIPTION OF THE PREFERRED EMBODIMENT

1. Detailed Description of the Figures

Figure 1:
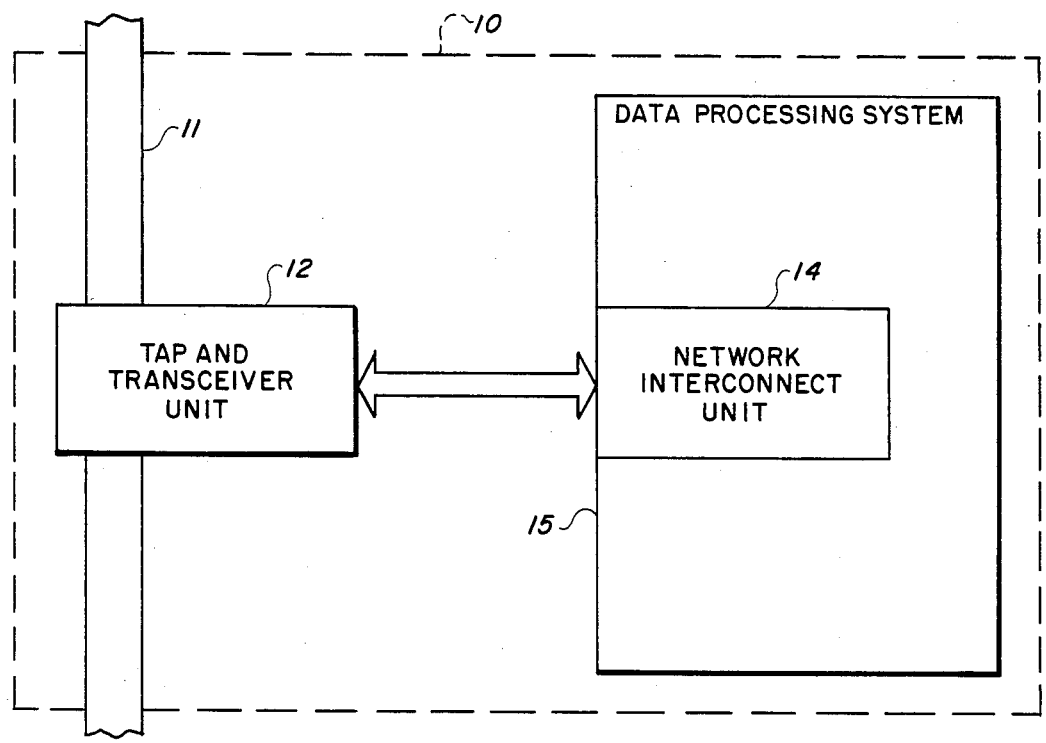
FIG. 1 is a block diagram of a local area network system member coupled to the segment cable.

FIG. 1 has been described with reference to the related art.

Figure 2:
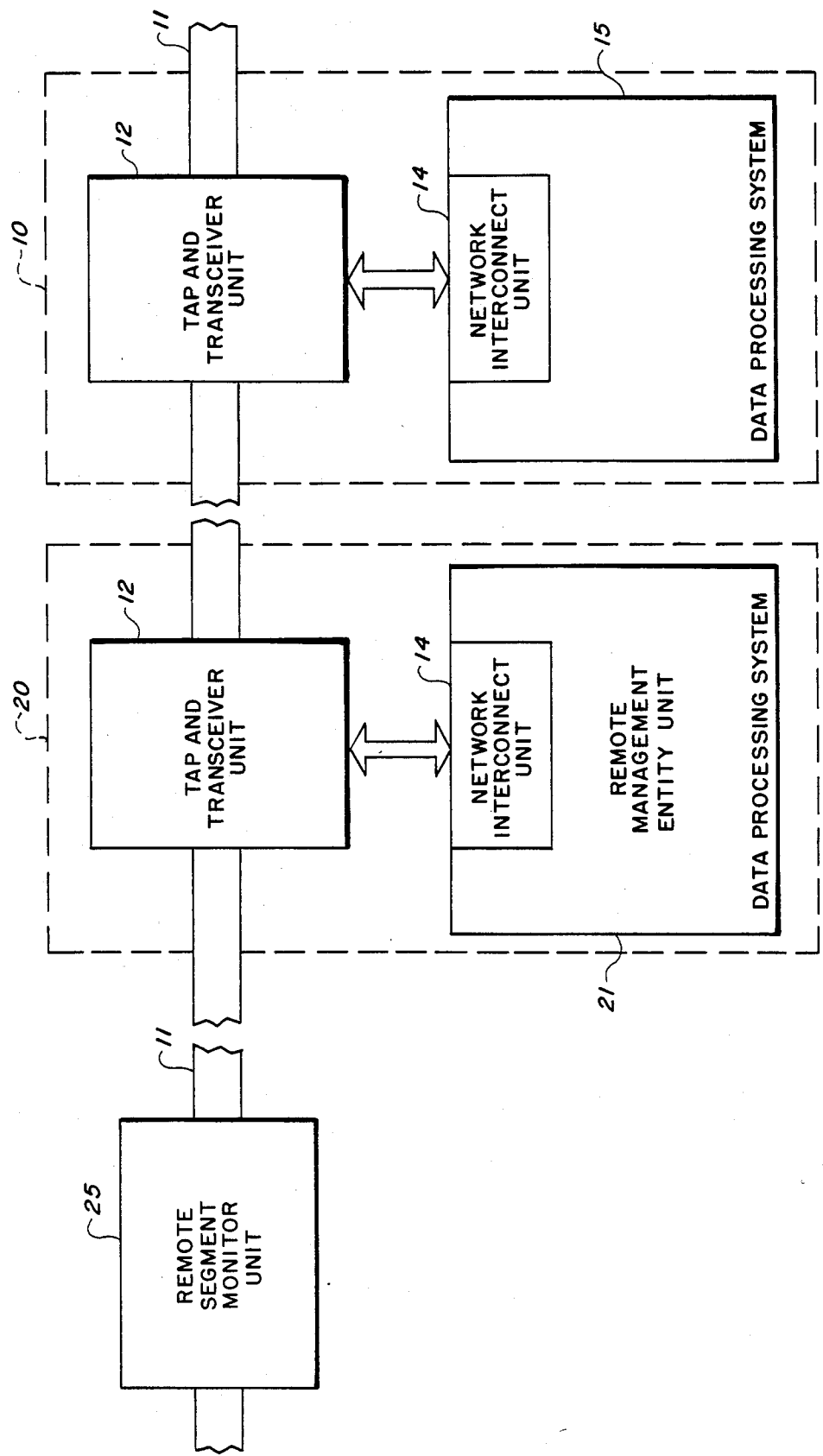
FIG. 2 is a block diagram of the principal components of the signal analyzing network of the present invention.

FIG. 2 illustrates the relationship of the components of the local area network signal analyzing network of the present invention. A plurality of system members 10 (each system member 10 typically including a tap unit and transceiver unit 12, a network interconnect unit 14 and a data processing system 15) are coupled to segment cable 11, the segment cable providing the communication path between the system members 10. One system member 20, has a data processing system referred to as a remote management entity unit 21. Finally, the cable segment 11 of the local area network can have a remote segment monitor unit 25 coupled thereto. The remote segment monitor unit 25 stores data related to transactions occurring over the cable segment 11. This stored data is periodically transferred to the remote management entity unit 21, wherein the data is analyzed and properties related to the transaction sources (or intervening apparatus such as cable segment repeaters) can be analyzed.

Figure 3:
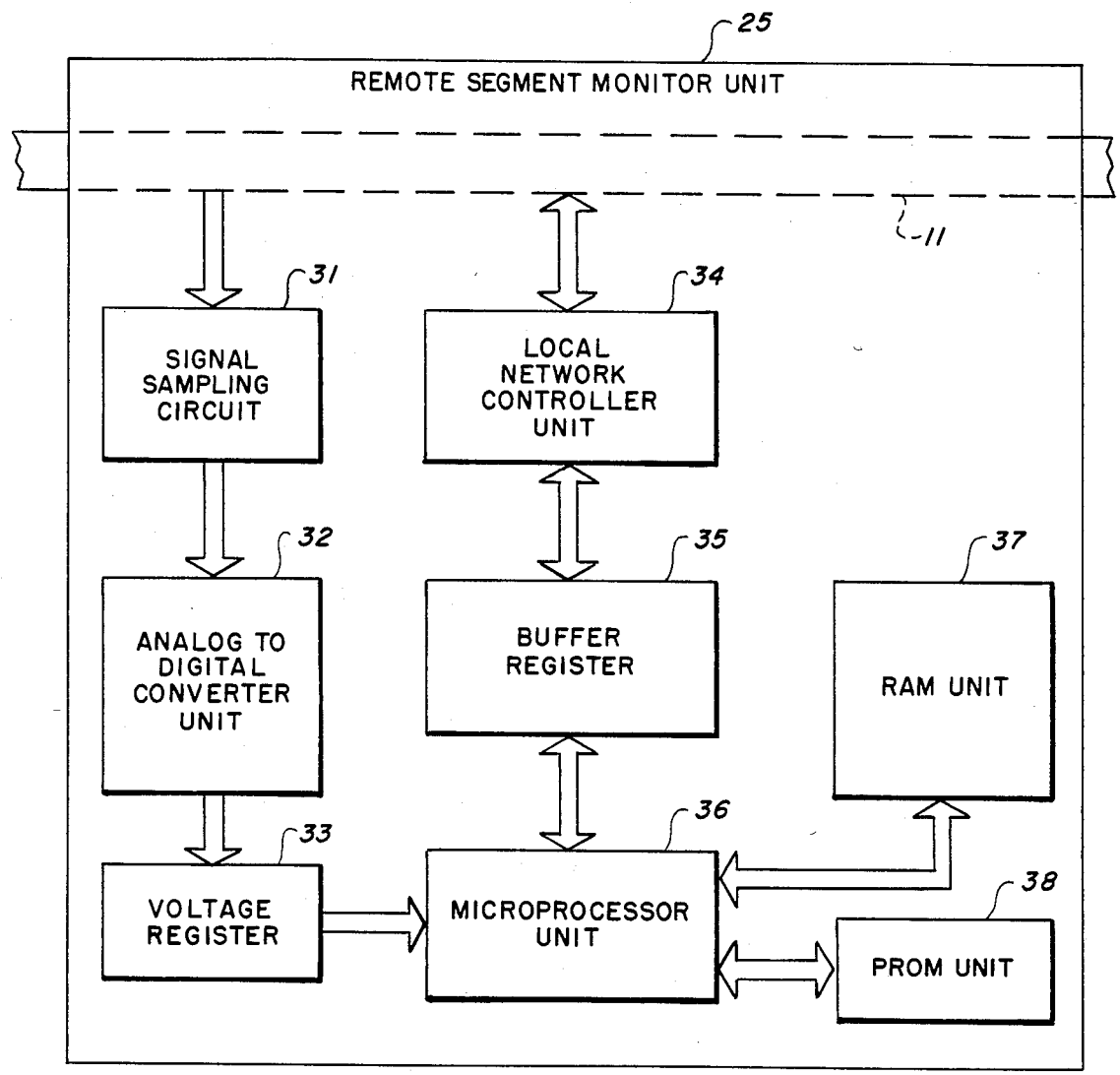
FIG. 3 is a block diagram remote segment monitor unit according to the present invention.

Referring next to FIG. 3, a block diagram of the components of the remote segment monitor unit 25, according to the present invention, is shown. A signal sampling circuit 31 receives signals from the segment cable 11 and applies the sampled signals to the analog to digital converter unit 32. The digitized signals from the analog to digital converter unit 32 are applied to and stored (temporarily) in voltage register 33. The local area network controller unit 34 receives signals from and applies signals to the cable segment 11. The buffer register unit 35 applies signals to and receives signals from the local area network controller unit 34. The buffer register unit 35 also transfers signals to and receives signals from the microprocessor unit 36. The microprocessor unit 36 can receive signals from the voltage register 33, receives signals from the PROM (programmable read only memory) unit 37 and can exchange signals with the RAM (random access memory) unit 37.

Figure 4:
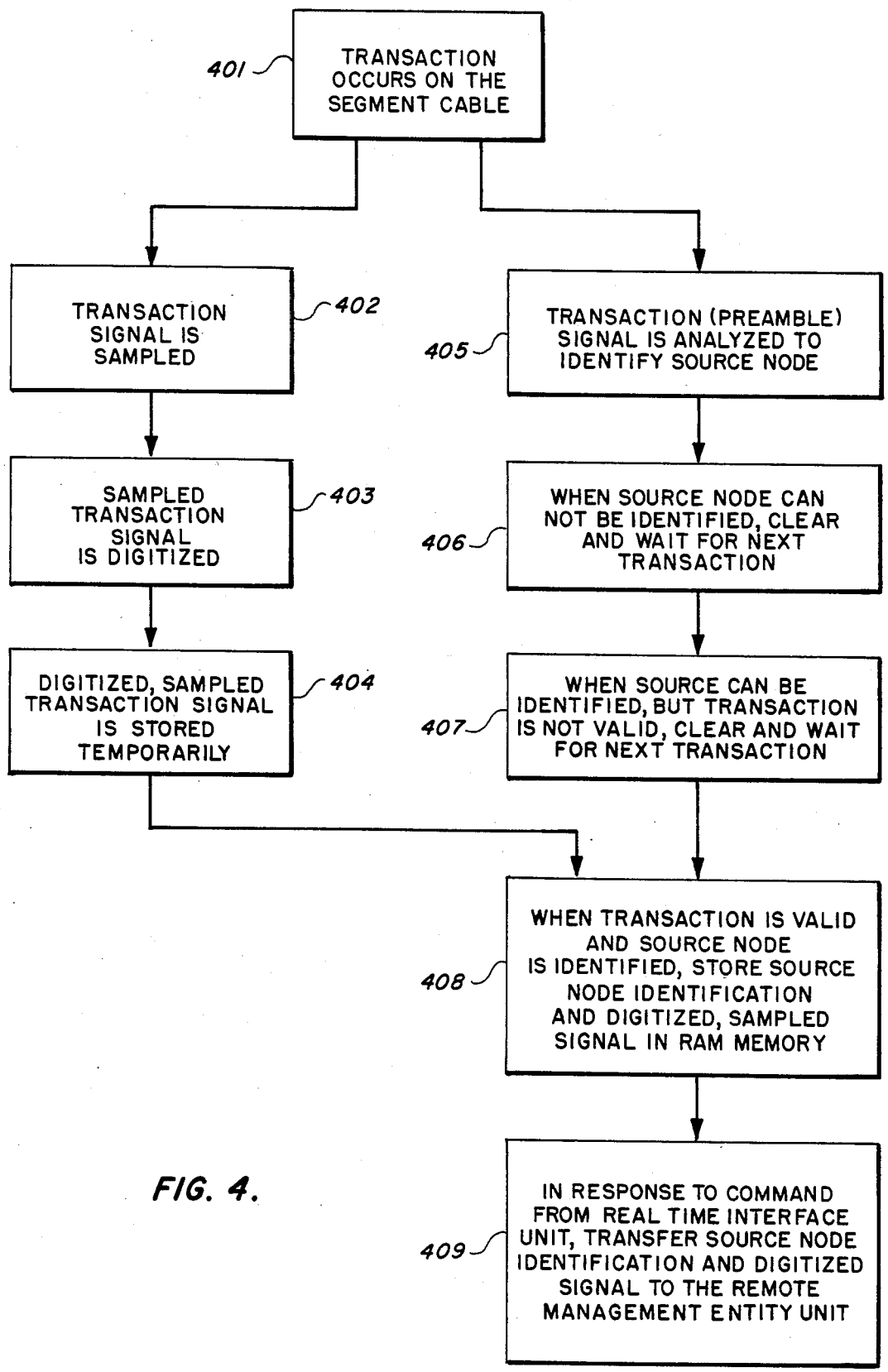
FIG. 4 is a flow diagram illustrating the operation of the remote segment monitor unit.

Referring next to FIG. 4, a flow diagram illustrating the operation of the remote segment monitor unit is shown. In step 401, a transaction occurs on the segment cable. As a result of the presence of a transaction signal on the segment cable, the transaction signal voltage level is sample in step 403. The sample transaction signal is digitized in step 403, and in step 404, the digitized, sampled transaction signal is temporarily stored (i.e., in voltage register 33). Simultaneously, the preamble or header of the transaction is being decoded and the node originating the transaction is identified in step 405. In step 406, when the source can not be identified, then the procedure is terminated and the digitized sampled and stored transaction signal is not used. When the source can be identified, but the transaction is not valid (e.g., as the result of a collision), then the procedure is terminated and digitized, sampled and stored signal is not used in step 407. When the transaction is valid and the source can be identified, then the source of the transaction and the associated sampled and digitized signal are stored in a memory in such a manner that the source identification and the stored transaction parameter are coupled. In response to a command from the remote management entity unit 21, the files of node identification signals and parameter signals associated with each transaction are transferred to the remote management entity unit for processing.

2. Operation of the Preferred Embodiment

The operation of the remote segment monitor unit 25 can be understood in the following manner. When a transaction is placed on segment cable 11, the remote segment monitor unit 20 samples the magnitude of the transaction signal by means of signaling sampling circuit 31. The sampled signal is applied to analog to digital converter unit 32 to obtain a digitized value proportional to the strength of the (sampled) transaction signal. This value is stored in a voltage register 33. Simultaneously, the local area network controller unit 34 decodes the transaction signal to the extent that the node from which the transaction originated, encoded in the preamble or header of the signal packet, can be identified. The preamble will also contain information, such as the identification of the destination node and the transaction message, which are ignored by the local network controller unit. In the preferred embodiment, the local area network controller unit 34 is a specialized processor unit for decoding signals from the segment cable and storing the decoded signals in the buffer register and for taking signals in the buffer register, encoding the signals in a proper format and applying the signals with proper protocols to the segment cable. For the operation of the current invention, the local area network controller unit 34 stores in the buffer register only that portion of the decoded transaction that identifies the originating node of the transaction (and a transfer data instruction described below). When the source node has been identified, and the transaction is determined to be a valid one (e.g., no collision between transactions is detected), then the source identification is transferred to the microprocessor unit 36. The microprocessor unit 36 stores the value in the voltage register 33 in the RAM unit 37 in such a manner that the voltage register value is associated with the transaction source identification.

The remote management entity unit node 20 periodically transfers to the microprocessor unit 36 a transfer data instruction. This instruction causes the microprocessor to retrieve the stored signal values from the RAM unit 37 and transfer this data, via the buffer register 35 and the local area network controller unit 34 to the remote management unit for analysis.

After repeated transfers of data from the remote segment monitor unit to the real time interface unit, a history of the signal (voltage) levels for each node (data processing system) is available. The values for each signal can be compared over a period of time and analyzed. The analysis can detect degrading signals and wildly varying signals. A degrading signal can be the result of one of the following conditions:

1. Failing transceiver unit curcuitry
2. A tap unit is becoming loose or is oxidizing.
3. A failing network interconnect unit. (The transceiver unit is powered by the network interconect unit, so that an apparent failure of the transceiver can, in fact, originate in the interconnect unit).
4. Bad transceiver cabling. (The power for the transceiver unit from the interconnect unit travels over the cable as do the data and collision signals).

By analyzing the data detected by the remote segment monitor unit in the remote management entity unit, the functionality of the remote segment monitor unit can be kept to a minimum. The limited functionality is important because a plurality of remote segment monitor units may be used to monitor a multi-segment local area network. A single remote management entity unit can be used in conjunction with the plurality of remote segment monitor units.

The remote management entity unit periodically receives the data from the remote segment monitor unit. This periodic transfer is used to associate the transferred data with time dimension. The granularity of the time dimension is then determined by the frequency with which data is transferred from the remote segment monitor unit.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. Apparatus for monitoring parameters of local area network system members, said monitoring apparatus coupled to a segment cable coupling said local area network members, wherein said local area network members apply transaction signal groups to said segment cable, said monitoring apparaus comprising:
   sampling means for determining a value related to a magnitude of each transaction signal group on said segment cable;
   decoding means for decoding selected portions of said transaction signal group, a one of said selected portions identifying a network system member originating said transaction; and
   storage means for storing said each transaction signal group magnitude in association with an originating system member identification.

2. The apparatus for monitoring parameters of local area network system members of claim 1 wherein said decoding means further includes means for identifying a preselected instruction, said preselected instruction causing said each transaction signal group magnitude and associated originating member identification to be applied to said cable segment.

3. The apparatus for monitoring parameters of local area network system members of claim 1 wherein said sampling means includes digitizing means for determining a logic signal group related to said each transaction signal group magnitude.

4. The apparatus for monitoring parameters of local area network system members of claim 2 wherein said decoding means is a portion of a controller unit, said controller unit decoding signals from said segment cable and encoding signals for application to said segment cable in response to said preselected instruction.

5. The apparatus for monitoring parameters of local area system network members of claim 4 further comprising:
   processor means for controlling storage of said each transaction signal group magnitude; and
   buffer means for exchanging signals with said controller unit.

6. The apparatus for monitoring parameters of local area network system members of claim 5 wherein said processor means is responsive to said preselected instruction for transferring said transaction group signal magnitudes to said controller unit.

7. The apparatus for monitoring parameters of local area network system members of claim 1 wherein said storing said each of said transaction signal group magnitudes in association with an originating system member identification is performed in a chronologically identifiable manner.

8. The method of monitoring parameters associated with members of a local area network system, said local area network system members applying transaction signal groups to a segment cable, said method comprising the steps of:
   identifying a source local area network system member from which each of said transaction signal groups originates, said source local area network system member identified by an identification signal group;
   determining a parameter associated with said each transaction signal group; and
   storing said identification signal group in association with said each transaction signal group parameter.

9. The method of monitoring parameters of local area network members of claim 8 further comprising the step of storing said transaction signal group parameters as a function of time.

10. The method of monitoring parameters of local area network members of claim 8 further comprising the step of analyzing said parameters by a different local area network system member to determine when signals associated with said each transaction signal group is in an acceptable range.

11. The method of monitoring parameters of local area network members of claim 8 wherein said determining step includes the step of associating a signal amplitude parameter for each transaction signal group, and converting said signal amplitude to a binary representation.

12. The method of monitoring parameters of local area network members of claim 8 further comprising the step of performing said step of said identifying, said step of determining step and said step of storing in a separate unit coupled to a segment cable of said local area network.

13. The method of monitoring parameters of local area network members of claim 12 further comprising the step of transferring said identification signal group and said transaction signal group parameter from said separate unit to a local area network member for analysis.

14. A unit for coupling to a segment cable of a local area network, said unit monitoring transmission signals of members of said local area network and components associated with said local area network coupled to said segment cable, said unit comprising:
   detection means for determining a parameter associated with each transaction signal applied to said segment cable;
   identification means for identifying a local area network member applying said each transaction signal to said segment cable, an identification of an identifying local area member included as part of said each transaction; and
   storage means for storing said each transaction signal parameter in association with said local area member identification applying said each transaction, wherein said transaction signal parameter and said associated identification are stored in a chronologically identifiable relationship.

15. The unit for monitoring said local area network members and components of claim 14 wherein said unit is responsive to a selected transaction signal applied to said segment cable, said unit causing said stored transaction signal parameter and said associated member identification to be applied to said segment cable.

16. The unit for monitoring said local area network members and components of claim 14 wherein said unit is controlled by a microprocessor unit.

17. The unit for monitoring said local area network members and components of claim 14 wherein said detection means includes means for sampling said transaction signal and means for digitizing an output signal of said means for sampling.

18. The unit for monitoring said local area network members and components of claim 16 further including a local area network controller for coupling said microprocessor unit to said segment cable.

19. The unit for monitoring said local area network members and components of claim 18 further including a random access memory unit coupled to said microprocessor for storing said transaction signal parameter and said associated member identification with said chronologically identifiable relationship.

20. The unit for monitoring said local area network members and components of claim 19 wherein said member identification includes component identification.

* * * * *